US012131697B2

(12) United States Patent
Chi

(10) Patent No.: US 12,131,697 B2
(45) Date of Patent: Oct. 29, 2024

(54) DISPLAY PANEL AND DISPLAY DEVICE

(71) Applicant: Shanghai Tianma Microelectronics Co., Ltd., Shanghai (CN)

(72) Inventor: Xiao Chi, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 0 days.

(21) Appl. No.: 17/583,256

(22) Filed: Jan. 25, 2022

(65) Prior Publication Data

US 2022/0148508 A1 May 12, 2022

(30) Foreign Application Priority Data

Nov. 30, 2021 (CN) ......................... 202111444285.4

(51) Int. Cl.
*G09G 3/3233* (2016.01)

(52) U.S. Cl.
CPC ..... *G09G 3/3233* (2013.01); *G09G 2310/061* (2013.01); *G09G 2310/08* (2013.01); *G09G 2320/0214* (2013.01); *G09G 2320/0233* (2013.01)

(58) Field of Classification Search
CPC ........... G09G 3/3233; G09G 2310/061; G09G 2310/08; G09G 2320/0214; G09G 2320/0233; G09G 2310/0216; G09G 2310/0251; G09G 2310/066; G09G 2340/0435; G09G 3/3208; G09G 2320/0626
See application file for complete search history.

(56) References Cited

U.S. PATENT DOCUMENTS 8,441,421 B2 * 5/2013 Han ..................... G09G 3/3233 345/82
8,547,372 B2 * 10/2013 Chung ................. G09G 3/3233 345/212
9,007,283 B2 * 4/2015 Choi ................... H01L 27/3265 345/82
11,211,004 B1 * 12/2021 Kim ..................... G09G 3/3266
2011/0157144 A1 * 6/2011 Park ..................... G09G 3/3233 345/212

(Continued)

FOREIGN PATENT DOCUMENTS

CN 110085170 A 8/2019
CN 111613177 A * 9/2020 ........... G09G 3/3208

(Continued)

*Primary Examiner* — Jeff Piziali
(74) *Attorney, Agent, or Firm* — KDW Firm PLLC

(57) ABSTRACT

Provided are a display panel and a display device. The display panel includes a pixel circuit and a light-emitting element. In the pixel circuit, the gate of a drive transistor is connected to a first node, a reset module includes a first transistor. One end of the first transistor is connected to the first node, and another end is connected to a second node. A compensation module includes a second transistor and a third transistor. The connection node between the second transistor and the third transistor is a third node. Another end of the second transistor is connected to the first node. In one refresh frame, the first transistor and the second transistor are off in a first stage, and a voltage V1 of the first node, a voltage V2 of the second node and a voltage V3 of the third node satisfy V1−V2=K(V3−V2).

20 Claims, 10 Drawing Sheets

(56) References Cited

U.S. PATENT DOCUMENTS

| | | | | |
|---|---|---|---|---|
| 2016/0372037 | A1* | 12/2016 | Lim | H01L 27/3265 |
| 2017/0148384 | A1* | 5/2017 | Lee | G09G 3/3233 |
| 2019/0096325 | A1* | 3/2019 | Miyasaka | G09G 3/3233 |

FOREIGN PATENT DOCUMENTS

| | | | | | |
|---|---|---|---|---|---|
| CN | 111816119 | A | * | 10/2020 | G09G 3/3208 |
| CN | 112382235 | A | | 2/2021 | |
| CN | 113192460 | A | | 7/2021 | |

* cited by examiner

DISPLAY PANEL AND DISPLAY DEVICE

CROSS-REFERENCE TO RELATED APPLICATIONS

This application claims priority to Chinese patent application No. 202111444285.4 filed with the China National Intellectual Property Administration (CNIPA) on Nov. 30, 2021, the disclosure of which is incorporated herein by reference in its entirety.

TECHNICAL FIELD

Embodiments of the present disclosure relate to the field of display technology and, in particular, to a display panel and a display device.

BACKGROUND

An organic light-emitting diode (OLED) has the advantages of low power consumption, low cost, self-luminescence, wide viewing angle and fast response speed, and has become one of the research hotspots in the field of display. An electronic display product adopts different refresh rates for display in different application scenarios. For example, a drive mode with a relatively high refresh rate is configured to drive the display of a dynamic image to ensure the smoothness of a display image, and a drive mode with a relatively low refresh rate is configured to drive the display of a static image to reduce power consumption.

When an electronic product using organic self-luminous technology adopts a low refresh rate for display, the potential of the gate of a drive transistor in an existing pixel circuit is varied due to the leakage currents of other switches. Therefore, the brightness of a light-emitting element is continuously lowered and then raised when the light-emitting element is driven to emit light. As a result, the display brightness of a display panel is unstable, and the display effect and user experience are seriously affected.

SUMMARY

The present disclosure provides a display panel and a display device to stabilize the gate potential of a drive transistor of a pixel circuit and to fix a leakage current. Therefore, the brightness of a light-emitting element can be stabilized, and the display effect of the display panel can be improved.

The present application provides a display panel.

The display panel includes a pixel circuit and a light-emitting element.

The pixel circuit includes a drive module, a reset module and a compensation module.

The drive module is configured to provide a drive current for the light-emitting element. The drive module includes a drive transistor. The gate of the drive transistor is connected to a first node.

The reset module is configured to provide a reset signal for the gate of the drive transistor. The reset module includes a first transistor. One end of the first transistor is connected to the first node. Another end of the first transistor is connected to a second node.

The compensation module is configured to compensate for the threshold voltage of the drive transistor. The compensation module includes a second transistor and a third transistor. The connection node between the second transistor and the third transistor is a third node. Another end of the second transistor is connected to the first node.

The display panel includes at least one refresh frame. In one refresh frame, the working process of the pixel circuit includes a first stage. In the first stage, the first transistor and the second transistor are turned off, and a voltage V1 of the first node, a voltage V2 of the second node and a voltage V3 of the third node satisfy that $V1-V2=K(V3-V2)$, where K denotes a fixed value and $0<K<1$.

The present application further provides a display device including the display panel described above.

DETAILED DESCRIPTION

Figure 1:
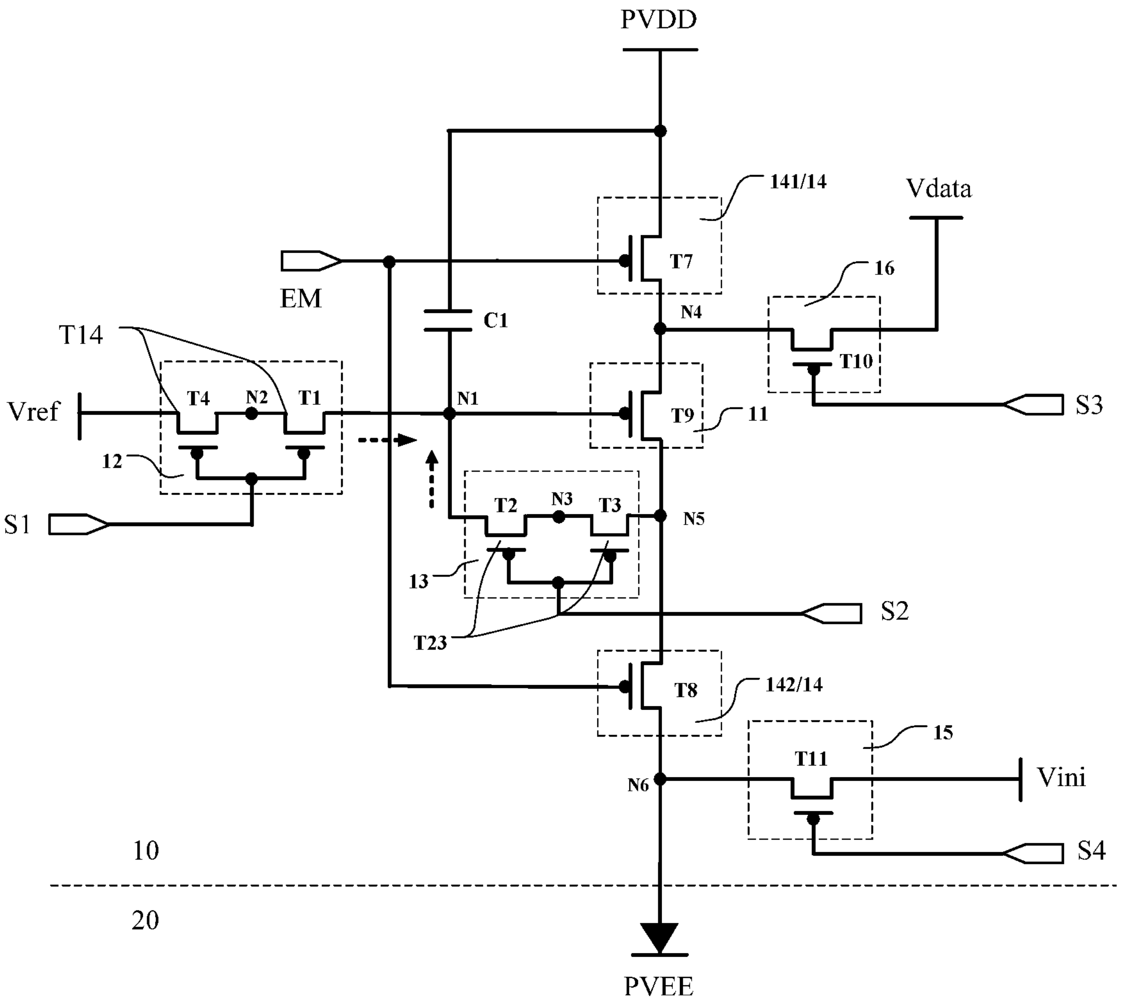
FIG. 1 (Prior Art)
FIG. 1 is a view illustrating the structure of a pixel circuit of an existing display panel according to an embodiment of the present disclosure.

The present disclosure is further described hereinafter in detail in conjunction with drawings and embodiments. It is to be understood that the embodiments described herein are merely intended to explain the present disclosure and not to limit the present disclosure. Additionally, it is to be noted that for ease of description, only part, not all, of the structures related to the present disclosure are illustrated in the drawings.

FIG. 1 is a view illustrating the structure of a pixel circuit of an existing display panel according to an embodiment of the present disclosure. As shown in FIG. 1, in the existing pixel circuit 10, a first node N1 is connected to the gate of a drive transistor T9, one end of a first double-gate transistor T14 and one end of a second double-gate transistor T23 respectively. It is to be understood by those skilled in the art that the pixel circuit 10 may include a reset stage, a data write stage and a light emission stage. In the reset stage, a reset signal Vref is provided by the first double-gate transistor T14 to reset the potential of the first node N1. In the data write stage, the second double-gate transistor T23 is configured to write a data signal into the first node N1, and meanwhile the threshold voltage of the drive transistor T9 is compensated to the potential of the first node N1. In the light emission stage, the drive transistor T9 is configured to drive a light-emitting element 20 to emit light by using the data signal of the gate, that is, the data signal stored by the first node N1 and compensated for by the threshold.

It is to be noted that one double-gate transistor in the pixel circuit includes two sub-transistors. Due to the parasitic capacitance between the gate and the connection node that is between the two sub-transistors, after the gate of one double-gate transistor receives a scan signal, the potential of the connection node between the two sub-transistors may be affected. For example, in a case where the first double-gate transistor T14 is a p-type double-gate transistor, the connection node between a first transistor T1 and a fourth transistor T4 in the first double gate transistor T14 is a second node N2. In the light emission stage, the gate of the first double-gate transistor T14 receives a first scan signal S1 (high-level signal) and is turned off, and the potential of the second node N2 is raised. In this manner, generally, the potential of the second node N2 may be greater than the potential of the first node N1. Therefore, at this stage, the leakage current of the first transistor T1 occurs, and the potential of the first node N1 increases. Similarly, due to the action of a second scan signal S2 (high-level signal), the potential of a third node N3 may be raised. In this manner, the potential of the third node N3 may also be greater than the potential of the first node N1. Therefore, a second transistor T2 in the second double-gate transistor T23 may also generate a leakage current to make the potential of the first node N1 increase. In this way, it is to be known that the potential of the first node N1 may cause a transistor to generate a leakage current due to the influence of the potential of the second node N2 and the potential of the third node N3. Thus, the potential of the first node N1 is affected. Since the potential variation of the second node N2 and the potential variation of the third node N3 are uncertain, the leakage current generated by the transistor is also unfixed and uncontrollable, and thus the potential of the first node N1 is unfixed and uncontrollable. Thus, it is difficult to ensure the stability of the brightness of the light-emitting element 20.

On the basis of the above description, an embodiment of the present disclosure provides a display panel. The display panel includes a pixel circuit and a light-emitting element. The pixel circuit includes a drive module, a reset module and a compensation module. The drive module is configured to provide a drive current for the light-emitting element. The drive module includes a drive transistor. The gate of the drive transistor is connected to a first node. The reset module is configured to provide a reset signal for the gate of the drive transistor. The reset module includes a first transistor. One end of the first transistor is connected to the first node. Another end of the first transistor is connected to a second node. The compensation module is configured to compensate for the threshold voltage of the drive transistor. The compensation module includes a second transistor and a third transistor. The connection node between the second transistor and the third transistor is a third node. Another end of the second transistor is connected to the first node. The display panel includes at least one refresh frame. In one refresh frame of the at least one refresh frame, the working process of the pixel circuit includes a first stage. In the first stage, the first transistor and the second transistor are turned off, and a voltage V1 of the first node, a voltage V2 of the second node and a voltage V3 of the third node satisfy that $V1-V2=K(V3-V2)$, where K denotes a fixed value and $0<K<1$.

In this embodiment, the first transistor and the second transistor in the pixel circuit 10 are configured to be turned off in the first stage. It is to be considered that the first stage is any stage other than a reset stage and a data write stage and may include a light emission stage. At this time, the voltage V1 of the first node, the voltage V2 of the second node and the voltage V3 of the third node satisfy that $V1-V2=K(V3-V2)$, where K denotes a fixed value and $0<K<1$. Therefore, it is to be ensured that the voltage difference between V1 and V2 is less than the voltage difference between V3 and V2, and the ratio of the voltage difference between V1 and V2 to the voltage difference between V3 and V2 is a fixed value, that is, the ratio of the voltage difference between V1 of the first node and V2 to the voltage difference between V3 and V1 of the first node is fixed. Thus, the leakage current generated by the first transistor and the leakage current generated by the second transistor are fixed. The voltage V2 of the second node and the voltage V3 of the third node are adjusted according to different values of K to make the leakage current generated by the first transistor and the leakage current generated by the second transistor stable and controllable. Further, the voltage V1 of the first node can be ensured to be stable. Therefore, in the pixel circuit provided by the embodiment of the present disclosure, on the basis of the relationship of $V1-V2=K(V3-V2)$, where K is a fixed value, $0<K<1$, and the voltage V2 of the second node and the voltage V3 of the third node are adjusted to make the ratio of the voltage difference between V1 and V2 to the voltage difference between V3 and V1 fixed. Therefore, the leakage current from the second node to the first node and the leakage current from the third node to the first node can be effectively adjusted, and the stability of the leakage currents of transistors between nodes can be controlled. In this manner, the potential of the first node can be adjusted to ensure the accuracy of the potential of the first node in the light emission stage. Thus, the stability and the accuracy of the brightness of the light-emitting element 20 can be implemented, and the display effect of the display panel can be improved.

The preceding is the core idea of the present disclosure. Hereinafter, the technical schemes in the embodiments of the present disclosure are described clearly and completely in conjunction with the drawings in the embodiments of the present disclosure. On the basis of the embodiments of the present disclosure, all other embodiments obtained by those having ordinary skill in the art without creative work are within the scope of the present disclosure.

Figure 2:
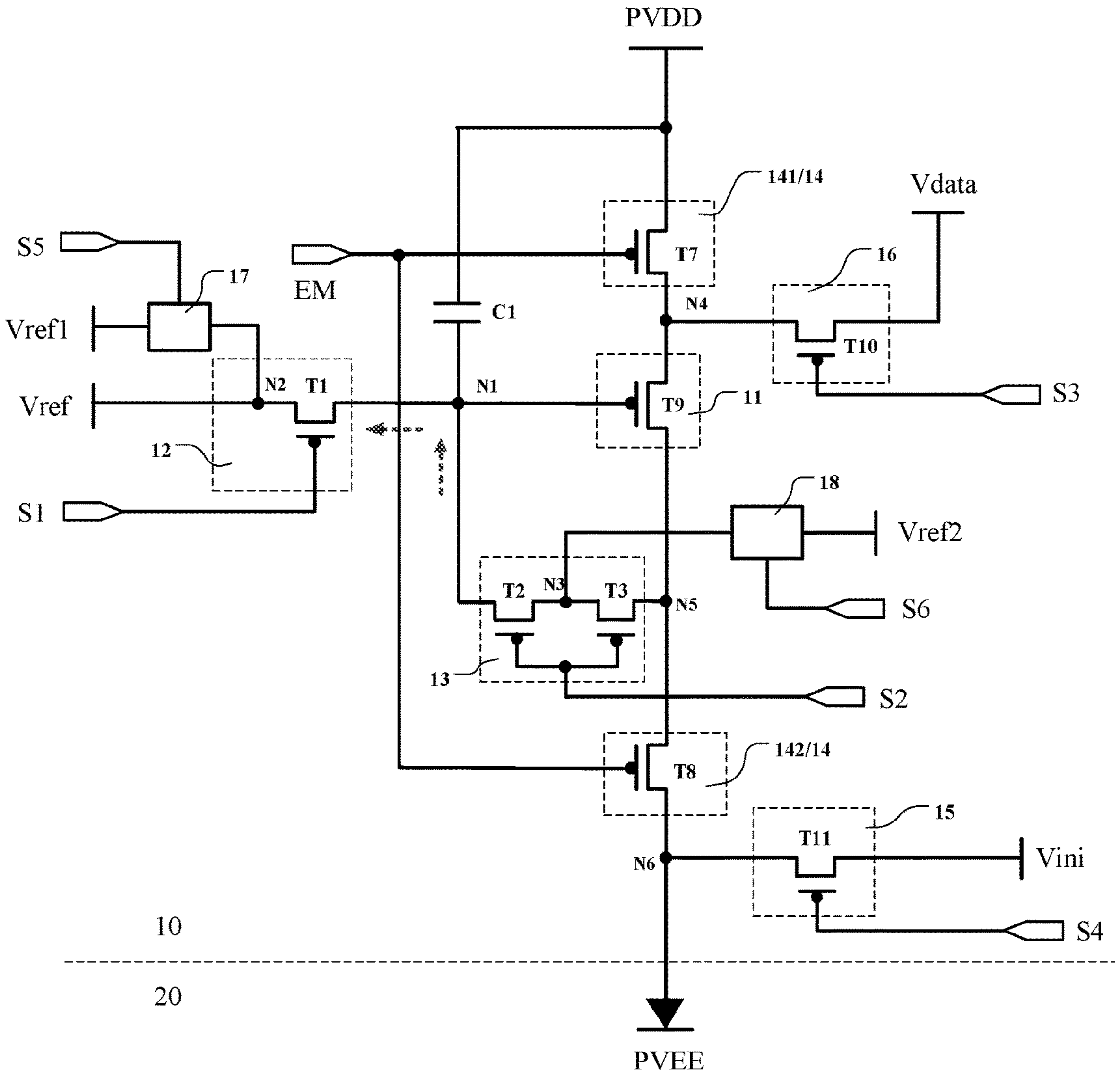
FIG. 2 is a view illustrating the structure of a pixel circuit and a light-emitting element of a display panel according to an embodiment of the present disclosure.

FIG. 2 is a view illustrating the structure of a pixel circuit and a light-emitting element of a display panel according to an embodiment of the present disclosure. As shown in FIG. 2, the display panel includes a pixel circuit 10 and a light-emitting element 20. The pixel circuit 10 includes a drive module 11, a reset module 12 and a compensation module 13. The drive module 11 is configured to provide a drive current for the light-emitting element 20. The drive module 11 includes a drive transistor T9. The gate of the drive transistor T9 is connected to a first node N1. The reset module 12 is configured to provide a reset signal for the gate of the drive transistor T9. The reset module 12 includes a first transistor T1. One end of the first transistor T1 is connected to the first node N1. Another end of the first transistor T1 is connected to a second node N2. The compensation module 13 is configured to compensate for the threshold voltage of the drive transistor T9. The compensation module 13 includes a second transistor T2 and a third transistor T3. The connection node between the second transistor T2 and the third transistor T3 is a third node N3. Another end of the second transistor T2 is connected to the first node N1. The display panel includes at least one refresh frame. In one refresh frame, the working process of the pixel circuit 10 includes a first stage. In the first stage, the first transistor T1 and the second transistor T2 are turned off, and the voltage V1 of the first node, the voltage V2 of the second node and the voltage V3 of the third node satisfy that $V1-V2=K(V3-V2)$, where K denotes a fixed value and $0<K<1$.

It is to be noted that the second transistor T2 and the third transistor T3 form a double-gate transistor. In a case where the double-gate transistor may be a p-type transistor, when the control signal provided for the gate of the double-gate transistor is a high-level signal, the transistor is turned off; and when the control signal provided for the gate of the double-gate transistor is a low-level signal, the transistor is turned on. In a case where the double-gate transistor may be an n-type transistor, when the control signal provided for the gate of the double-gate transistor is a low-level signal, the transistor is turned off; and when the control signal provided for the gates of the double-gate transistor is a high-level signal, the transistor is turned on. This is not limited in this embodiment.

Further, with continued reference to FIG. 2, the pixel circuit 10 also includes a data write module 16. The data write module 16 is configured to write a data signal into the gate of the drive transistor T9. In one refresh frame, the working process of the pixel circuit 10 further includes a second stage. In the second stage, the second transistor T2 and the third transistor T3 are turned on, and the data write module 16 is configured to write, into the first node N1, a data signal Vdata that is provided by a data signal terminal and is compensated for by the threshold voltage Vth of the drive transistor T9.

It is to be understood by those skilled in the art that the data write module 16 includes a tenth transistor T10. The data signal terminal is connected to a first end of the drive transistor T9 through the tenth transistor T10. The drive process of the pixel circuit 10 includes an initialization (reset) stage, a data write stage and a light emission stage. In the initialization (reset) stage, a first scan signal S1 drives the first transistor T1 to be turned on, and a reset signal Vref is written into the first node N1. The data write stage is the above-mentioned second stage and is before the light emission stage. At this time, a third scan signal S3 drives the tenth transistor T10 to be turned on. At the same time, a second scan signal S2 drives the second transistor T2 and the third transistor T3 to be turned on. The data signal Vdata flows into the first node N1 through the tenth transistor T10, the drive transistor T9, the third transistor T3 and the second transistor T2 in sequence. Moreover, since the voltage of a fourth node N4 is Vdata, when the voltage of the first node N1 reaches $Vdata-Vth$ (Vth is the threshold voltage of the drive transistor T9), the drive transistor T9 may be turned off. That is, at this stage, a data signal $Vdata-Vth$ is written into the first node N1 and is compensated for by the threshold.

Further, with continued reference to FIG. 2, the second node N2 is further electrically connected to a first signal terminal, and the third node N3 is further electrically connected to a second signal terminal. It is to be understood that in the first stage, the first transistor T1 and the second transistor T2 are turned off. Since a first signal Vref1 provided by the first signal terminal is sent to the second node N2 to make the voltage V2 of the second node N2 satisfy that $V2=Vref1$, and a second signal Vref2 provided by the second signal terminal is sent to the third node N3 to make the voltage V3 of the third node N3 satisfy that $V3=Vref2$. Therefore, at this time, the voltage V1 of the first node, the voltage V2 of the second node and the voltage V3 of the third node satisfy the relationship of $V1-Vref1=K(Vref2-Vref1)$, where K denotes a fixed value and $0<K<1$. The given first signal Vref1 and the given second signal Vref2 are adjusted to satisfy the above relationship. Thus, the ratio of the voltage difference between the voltage V1 of the first node and first signal Vref1 to the voltage difference between the second signal Vref2 and the voltage V1 of the first node is fixed. In this manner, the voltage difference between the nodes at two ends of the first transistor T1 and the voltage difference between the nodes at two ends of the second transistor T2 are controlled to be relatively stable to ensure that the leakage currents generated by the transistors are fixed and that the voltage of the first node N1 is stable. Thus, the accuracy of the brightness of the light-emitting element 20 can be controlled to improve the display effect of the display panel.

Figure 3:
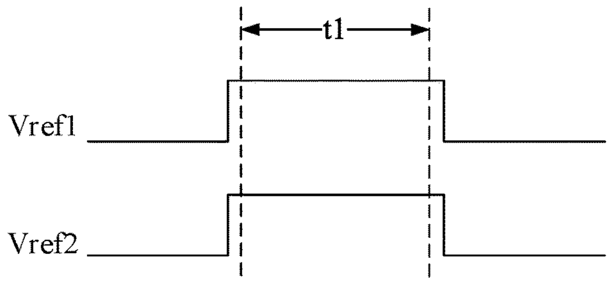
FIG. 3 is a timing diagram of a first signal and a second signal according to an embodiment of the present disclosure.

In an embodiment, FIG. 3 is a timing diagram of a first signal and a second signal according to an embodiment of the present disclosure. Referring to FIGS. 2 and 3, in the first stage t1, the potential of the first signal Vref1 and the potential of the second signal Vref2 are fixed. In other words, in the first stage t1, the first signal Vref1 provided by the first signal terminal and the second signal Vref2 provided by the second signal terminal are constant voltage values.

It is to be noted that in different refresh frames, the first signal Vref1 and the second signal Vref2 may be different voltage values. The reason is that the brightness of the light-emitting element 20 in different refresh frames may be different, and the data signals written into the voltage V1 of the first node may be different. Thus, to satisfy the relationship of $V1-Vref1=K(Vref2-Vref1)$, the given first signal Vref1 and the given second signal Vref2 need to be adjusted to fix the leakage currents generated by the transistors and to ensure that the voltage of the first node N1 is stable.

In an embodiment, in the first stage of one refresh frame, the first signal Vref1 and the second signal Vref2 satisfy that $Vdata'-Vth-Vref1=K(Vref2-Vref1)$, where K denotes a fixed value, $0<K<1$, and Vdata' denotes the data signal provided by the data signal terminal in the second stage of the current refresh frame.

In the second stage of one refresh frame, the data write module 16 is configured to write, into the first node N1, the data signal Vdata' provided by the data signal terminal to make the voltage V1 of the first node N1 satisfy that $V1=Vdata'-Vth$ finally. Therefore, at the end of the second stage, the drive process of the pixel circuit 10 enters the first stage. At this time, the first signal Vref1 provided by the first signal terminal is sent to the second node N2 to make the voltage V2 of the second node N2 satisfy that $V2=Vref1$, and the second signal Vref2 provided by the second signal terminal is sent to the third node N3 to make the voltage V3 of the third node N3 satisfy that $V3=Vref2$. The given value of the first signal Vref1 and the given value of the second signal Vref2 are adjusted according to the data signal Vdata' provided by the data signal terminal to satisfy the relationship of $Vdata'-Vth-Vref1=K(Vref2-Vref1)$, where K denotes a fixed value and $0<K<1$. In this manner, in each refresh frame, the voltage value of the first signal Vref1 and the voltage value of the second signal Vref2 are adjusted according to different data signals Vdata' currently written to the first node N1 to ensure that in each refresh frame, the voltage V1 of the first node can be effectively compensated. Therefore, the leakage currents generated by the transistors between nodes are stable, and the stability of the voltage V1 of the first node can be controlled. Thus, the brightness of the light-emitting element 20 can be stabilized to emit light accurately, and the display effect of the display panel can be improved. In an embodiment, when the equivalent resistance of the first transistor T1 is the same as the equivalent resistance of the second transistor T2, the value of K is configured to be ½ to ensure that the voltage V1 of the first node N1 is stabilized at Vdata'−Vth. Therefore, the influence of the voltage variation of the second node N2 and the voltage variation of the third node N3 on the voltage of the first node N1 is avoided, and the brightness of the light-emitting element 20 can be more accurate.

In addition, in an embodiment, in any two refresh frames, the first signal Vref1 and the second signal Vref2 remain invariable and satisfy that Vdata"−Vth−Vref1=K(Vref2−Vref1) in the first stage, where K denotes a fixed value, 0<K<1, and Vdata"−Vth denotes a virtual set value of the voltage V1 of the first node.

The virtual set value is a value artificially assumed according to an actual working condition. According to the assumed value, it is convenient for operation analysis and control design. Thus, the control structure can be simplified and the design difficulty of the circuit can be reduced.

In an embodiment, in any refresh frame of the display image of the display panel, the first signal Vref1 and the second signal Vref2 given in the first stage remain invariable. The voltage V1 of the first node is set to the virtual set value Vdata"−Vth, and the first signal Vref1 and the second signal Vref2 are calculated according to the relationship of Vdata"−Vth−Vref1=K(Vref2−Vref1). In this manner, an appropriate first signal Vref1 and an appropriate second signal Vref2 are respectively selected as the signal provided by the second node N2 and the signal provided by the third node N3 in the first stage according to an actual condition. Therefore, in any refresh frame, the first signal Vref1 and the second signal Vref2 are set to be consistent with the first signal Vref1 and the second signal Vref2 in other refresh frames to make signals and the control circuit structure simple. At the same time, the first signal Vref1 and the second signal Vref2 can effectively compensate for the voltage V1 of the first node in each refresh frame to ensure that the leakage current of the first transistor T1 and the leakage current of the second transistor T2 can be effectively controlled and remain stable. In this manner, the stability of the voltage of the first node N1 can be ensured. Thus, the accuracy of the brightness can be improved, and the display effect of the display panel can be improved.

Further, in any one refresh frame, the gray value of the light-emitting element 20 is within an interval [G1, G2]. When Vdata" serves as the data signal provided by the data signal terminal, the gray value of the light-emitting element 20 is within an interval [(G1+G2)/2, G2].

It is to be understood by those skilled in the art that each pixel corresponds to one gray value that may be considered as the brightness of the light-emitting element 20. The higher the gray value is, the higher the brightness of the light-emitting element 20 is. At the same time, the light-emitting element 20 is more inclined to a high grayscale. At a high grayscale, the variation of the brightness of the light-emitting element 20 caused by the variation of a leakage current is apparent. Therefore, when the light-emitting element 20 is in a high grayscale, the voltage of the first node N1 needs to be compensated to reduce the leakage currents of the transistors between the nodes. In this manner, the voltage of the first node N1 remains stable, and the brightness of the light-emitting element 20 is prevented from being affected.

When the gray value of the light-emitting element 20 is within the interval [(G1+G2)/2, G2], the gray value of the light-emitting element 20 is within the upper half of the interval [G1, G2], that is, the light-emitting element 20 is within a high grayscale interval. The virtual set value of the voltage V1 of the first node N1 is selected to make the gray value of the light-emitting element 20 within the interval [(G1+G2)/2, G2], which is essentially assumed that the data signal terminal provides the data signal Vdata", so that the brightness of the light-emitting element 20 is one high grayscale value within the interval [(G1+G2)/2, G2]. Therefore, in the case where the first signal Vref1 and the second signal Vref2 are calculated according to the virtual set data signal Vdata" and the relationship of Vdata"−Vth−Vref1=K(Vref2−Vref1), the effective control and the stability of the leakage currents of the transistors between the nodes can be implemented when the light-emitting element 20 is at the high grayscale value. In this manner, the voltage of the first node N1 is stable. In addition, for refresh frames of other grayscales, especially refresh frames of high grayscales, the first signal Vref1 and the second signal Vref2 can also control the leakage currents to a certain extent. Therefore, it is ensured that the potential of the first node N1 is relatively stable, and the light-emitting element 20 can be driven to emit light accurately.

For example, when the gray value interval of the light-emitting element 20 is [0, 255], and it is set that Vdata" serves as the data signal provided by the data signal terminal, the gray value of the light-emitting element 20 is 186 nit and is within an interval [128, 255]. The data signal Vdata" provided by the data signal terminal is the voltage write value of the first node N1, that is, V1=Vdata"−Vth. Further, the first signal Vref1 and the second signal Vref2 are calculated according to the relationship of Vdata"−Vth−Vref1=K(Vref2−Vref1), and the first signal Vref1 and the second signal Vref2 are used as signals provided for the second node N2 and the third node N3 in the first stage in any refresh frame. At this time, the first signal Vref1 and the second signal Vref2 can ensure that the leakage currents of the transistors between the nodes are effectively controlled in the refresh frame of the gray value of 186 nit. Therefore, the potential of the first node N1 is stabilized. At the same time, for refresh frames of other gray values, the leakage currents can also be compensated to a certain extent to achieve the purpose of stabilizing the leakage currents.

Figure 4:
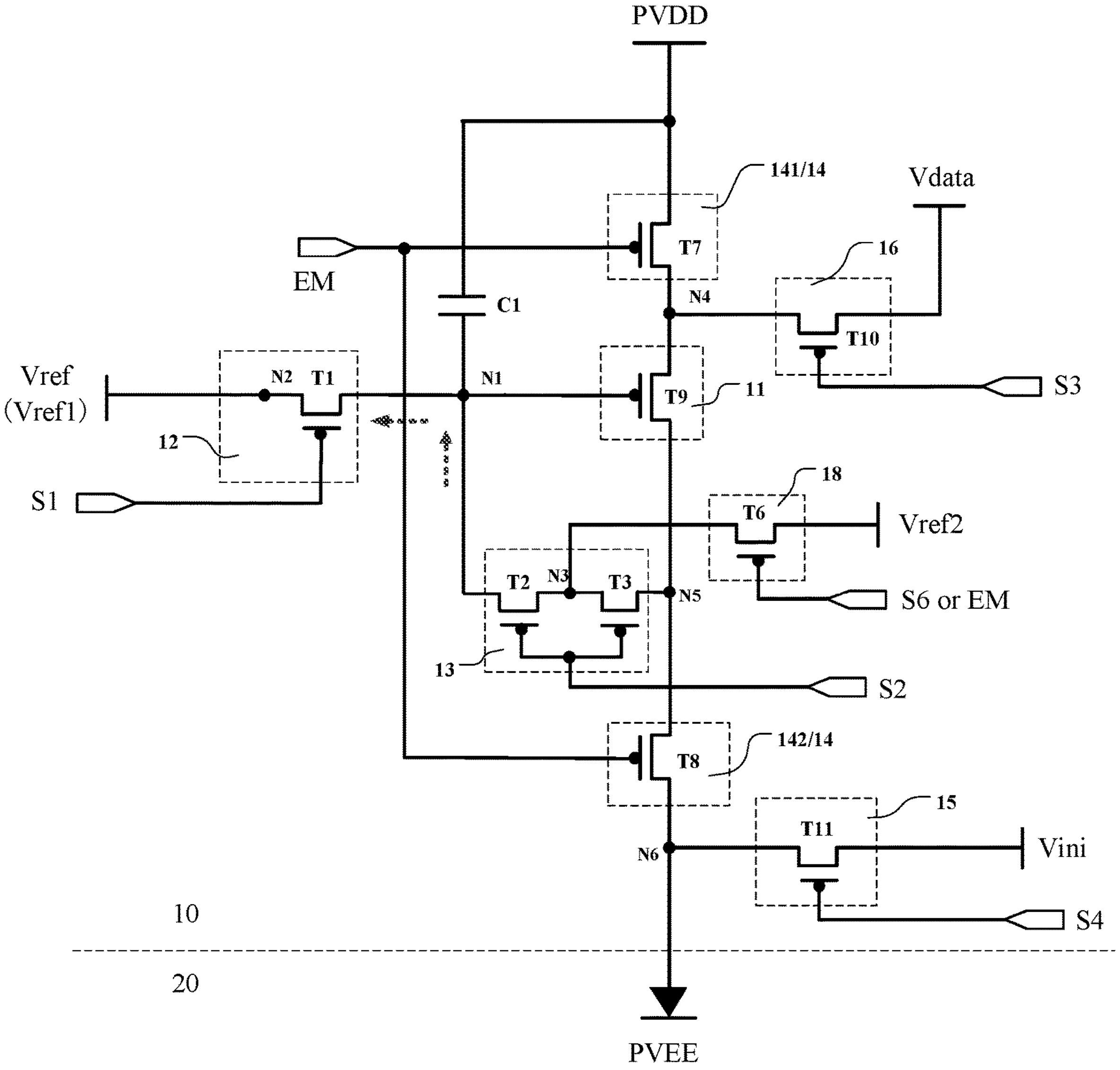
FIG. 4 is a view illustrating the structure of a pixel circuit and a light-emitting element of another display panel according to an embodiment of the present disclosure.

In an embodiment, FIG. 4 is a view illustrating the structure of a pixel circuit and a light-emitting element of another display panel according to an embodiment of the present disclosure. As shown in FIG. 4, a reset module 12 is connected between a reset signal terminal Vref and the gate of the drive transistor T9. The reset signal terminal also serves as a first signal terminal. The pixel circuit further includes a second signal input control module 18 connected between the third node N3 and a second signal terminal. The second signal input control module 18 is turned on before the first stage.

The reset signal terminal is also configured to serve as the first signal terminal, that is, in the first stage, a reset signal Vref provided by the reset signal terminal is provided for the second node N2 as the first signal Vref1 to simplify the circuit wiring. At the same time, when the second signal input control module 18 is turned on, the second signal terminal is configured to provide the second signal Vref2 for the third node N3. The voltage value of the second signal Vref2 may be determined according to the reset signal Vref provided by the reset signal terminal to satisfy that V1−Vref=K(Vref2−Vref), where K denotes a fixed value and 0<K<1. In an embodiment, when the equivalent resistance of the first transistor T1 is the same as the equivalent resistance of the second transistor T2, the value of K is ½. In this manner, the voltage of the first node N1 remains stable and invariable, and the accuracy of the brightness of the light-emitting element 20 is ensured.

It is to be noted that the second signal input control module 18 may be controlled to be turned on through a scan signal S6 and is turned on before the first stage. In this manner, when the circuit working state enters the first stage, the second signal Vref2 provided by the second signal terminal for the third node N3 is stable to avoid that the potential of the third node N3 is influenced at the moment when the second signal input control module 18 is turned on.

Further, in an embodiment, with continued reference to FIG. 4, the second signal input control module 18 includes a sixth transistor T6. One end of the sixth transistor T6 is connected to the third node N3. Another end of the sixth transistor T6 is connected to the second signal terminal Vref2. The pixel circuit 10 further includes a light emission control module 14. The light emission control module 14 includes a first light emission control unit 141 and a second light emission control unit 142. The first light emission control unit 141, the drive module 11, the second light emission control unit 142, and the light-emitting element 20 are sequentially connected in series between a first power terminal PVDD and a second power terminal PVEE. The first light emission control unit 141 includes a seventh transistor T7. The second light emission control unit 142 includes an eighth transistor T8. The gate of the seventh transistor T7 and the gate of the eighth transistor T8 are connected to a light emission control signal terminal. The gate of the sixth transistor T6 is connected to the light emission control signal terminal.

The second signal input control module 18 includes a sixth transistor T6. The scan signal S6 that controls the sixth transistor T6 to be turned on may be provided by the light emission control signal terminal to simplify the circuit wiring.

Figure 5:
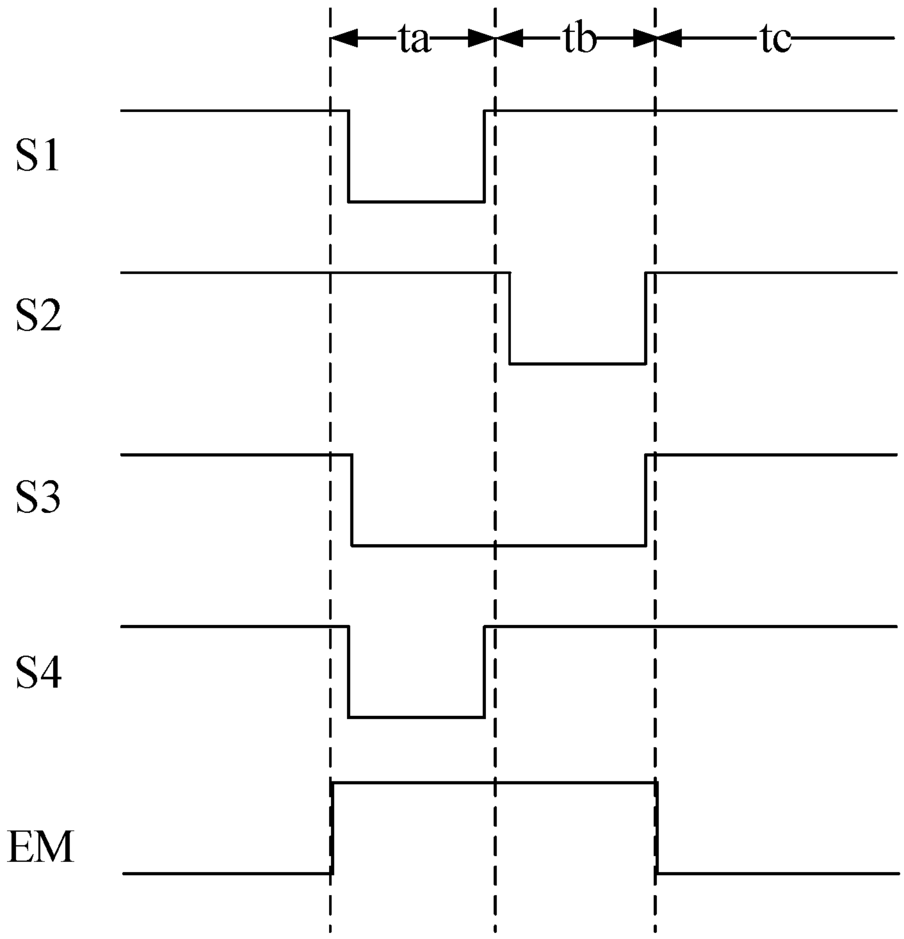
FIG. 5 is a timing diagram of drive signals of a pixel circuit according to an embodiment of the present disclosure.

FIG. 5 is a timing diagram of drive signals of a pixel circuit according to an embodiment of the present disclosure. With reference to FIGS. 4 to 5, the function module and the drive process of the pixel circuit in the embodiment of the present disclosure are described. It is to be understood by those skilled in the art that the pixel circuit 10 further includes an initialization module 15. The initialization module 15 includes an eleventh transistor T11. One end of the eleventh transistor T11 is connected to an initialization signal terminal Vini. Another end of the eleventh transistor T11 is connected to the anode of the light-emitting element 20. For example, the transistors in the pixel circuit 10 adopt p-type transistors. When the control signal provided for the gates of the transistors is a high-level signal, the transistors are turned off. When the control signal provided for the gates of the transistors is a low-level signal, the transistors are turned on.

In an initialization (reset) stage ta, a first scan signal S1 hops from a high level to a low level. At this time, the first transistor T1 is turned on, and the reset signal Vref is written into the first node N1. At the same time, a fourth scan signal S4 hops from a high level to a low level. At this time, the eleventh transistor T11 is turned on, and an initialization signal Vini is written into the anode of the light-emitting element 20 to avoid the influence of the voltage signal written in the previous frame.

In a data write (threshold capture) stage tb, a third scan signal S3 hops from a high level to a low level. At this time, a tenth transistor T10 is turned on. At the same time, a second scan signal S2 hops from a high level to a low level. At this time, the second transistor T2 and the third transistor T3 are turned on, and a data signal Vdata flows into the first node N1 through the tenth transistor T10, the drive transistor T9, the third transistor T3 and the second transistor T2 in sequence. Moreover, since the voltage of a fourth node N4 is Vdata, when the voltage of the first node N1 reaches Vdata−Vth, the drive transistor T9 may be turned off.

In a light emission stage tc, a light emission control signal EM hops from a high level to a low level. At this time, the seventh transistor T7 and the eighth transistor T8 are on. A path is formed between the first power voltage signal terminal PVDD and the second power voltage signal terminal PVEE. The light-emitting element 20 emits light, and the magnitude of the light-emitting current is controlled by the potential of the gate of the drive transistor T9. At the same time, the light emission control signal EM also provides a low-level signal for the gate of the sixth transistor T6 to turn on the sixth transistor T6, and then a second signal Vref2 is provided for the third node N3. Further, the voltage value of the second signal Vref2 may be determined according to the first signal Vref1 provided by the reset signal terminal (that is, the first signal terminal) for the second node N2. Thus, the voltage V1 of the first node, the first signal Vref1 and the second signal Vref2 satisfy the relationship of V1−Vref1=K (Vref2−Vref1), where K denotes a fixed value and 0<K<1. In this manner, it is ensured that the leakage current generated by the first transistor T1 and the leakage current generated by the second transistor T2 are stable and controllable and that the voltage V1 of the first node N1 is stable.

Figure 6:
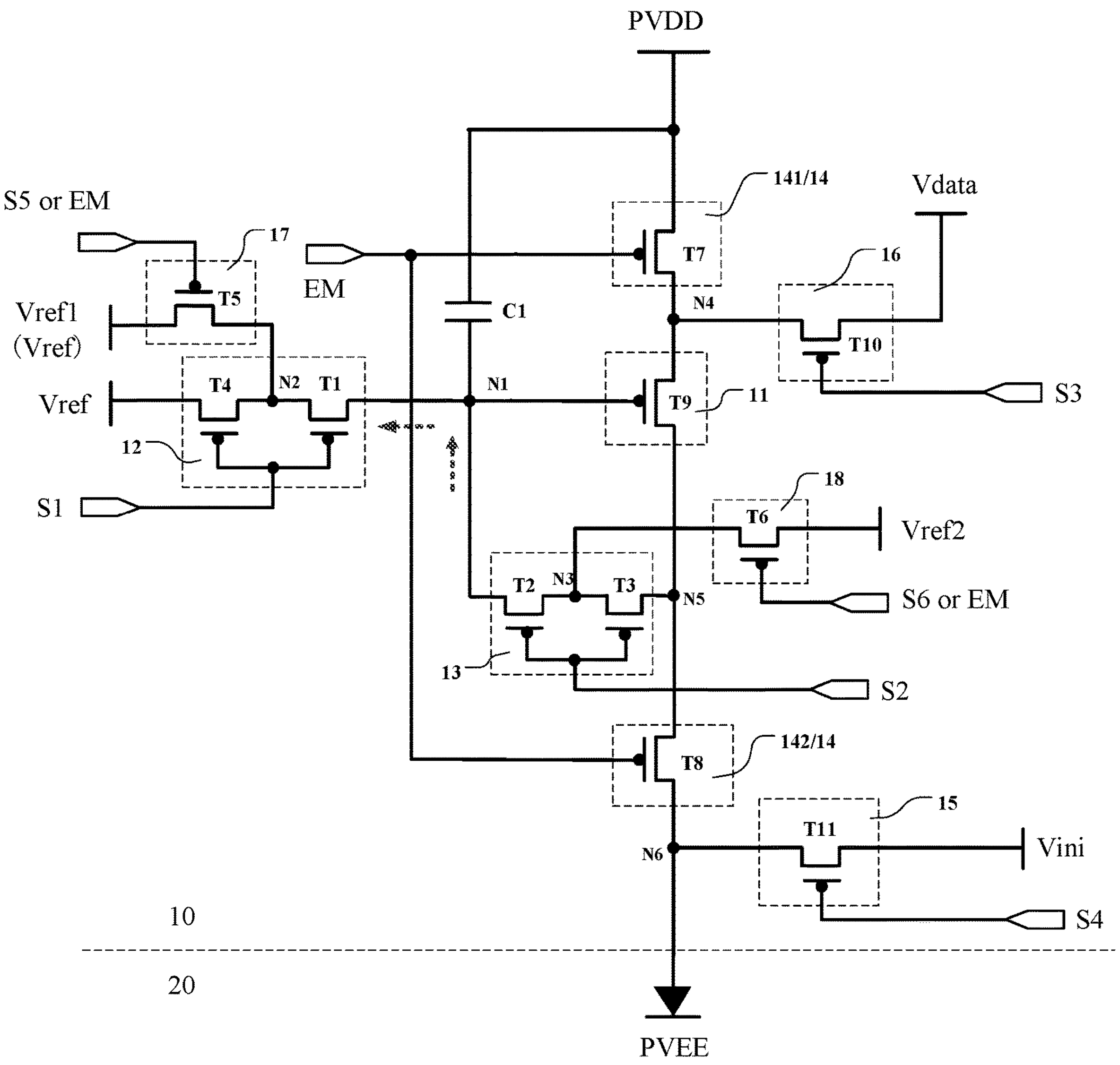
FIG. 6 is a view illustrating the structure of a pixel circuit and a light-emitting element of another display panel according to an embodiment of the present disclosure.

In another embodiment, FIG. 6 is a view illustrating the structure of a pixel circuit and a light-emitting element of another display panel according to an embodiment of the present disclosure. As shown in FIG. 6, a reset module 12 further includes a fourth transistor T4. The connection node between the fourth transistor T4 and the first transistor T1 is the second node N2. In other words, the first transistor T1 and the fourth transistor T4 form a double-gate transistor. A first scan signal S1 controls the first transistor T1 and the fourth transistor T4 to be turned on or off simultaneously.

In addition, the pixel circuit 10 further includes a first signal input control module 17 connected between the second node N2 and the first signal terminal Vref1. The first signal input control module 17 is turned on before the first stage.

It is set that when the first signal input control module 17 is turned on, the first signal terminal provides a first signal Vref1 for the second node N2. At the same time, when a second signal input control module 18 is turned on, a second signal terminal is configured to provide a second signal Vref2 for the third node N3. The first signal input control module 17 and the second signal input control module 18 are turned on before the first stage to ensure that when the circuit working state enters the first stage, the first signal Vref1 provided by the first signal terminal for the second node N2 and the second signal Vref2 provided by the second signal terminal for the third node N3 are stable to avoid that the potentials of nodes are influenced at the moment when signal input control modules are turned on. In this manner, the provided first signal Vref1 and the provided second signal Vref2 satisfy the relationship of V1−Vref=K(Vref2−Vref). In an embodiment, when the equivalent resistance of the first transistor T1 is the same as the equivalent resistance of the second transistor T2, K is ½. In this manner, the leakage current generated by the first transistor T1 and the leakage current generated by the second transistor T2 are stable, and the voltage V1 of the first node remains stable. Further, the accuracy of the brightness of the light-emitting element 20 is ensured, and the brightness flicker is avoided.

Further, in an embodiment, with continued reference to FIG. 6, a reset signal terminal also serves as the first signal terminal, that is, in the first stage, a reset signal Vref provided by the reset signal terminal is provided for the second node N2 as the first signal Vref1. In this manner, the circuit wiring can be simplified.

In addition, with continued reference to FIG. 6, the first signal input control module 17 includes a fifth transistor T5. One end of the fifth transistor T5 is connected to the second node N2. Another end of the fifth transistor T5 is connected to the first signal terminal. The second signal input control module 18 includes a sixth transistor T6. One end of the sixth transistor T6 is connected to the third node N3. Another end of the sixth transistor T6 is connected to the second signal terminal. In this manner, the fifth transistor T5 is controlled to be turned on, so that the first signal Vref1 provided by the first signal terminal may be written into the second node N2. At the same time, the sixth transistor T6 is controlled to be turned on, so that the second signal Vref2 provided by the second signal terminal may be written into the third node N3.

Further, with continued reference to FIG. 6, the gate of the fifth transistor T5 and/or the gate of the sixth transistor T6 is connected to the light emission control signal terminal. In this manner, at the moment when the pixel circuit enters a light emission stage, a light emission control signal EM controls a seventh transistor T7 and an eighth transistor T8 to be turned on, and at the same time, the light emission control signal EM further controls the fifth transistor T5 and/or the sixth transistor T6 to be turned on, so that the first signal Vref1 provided by the first signal terminal and the second signal Vref2 provided by the second signal terminal are written into the second node N2 and the third node N3, respectively. In this manner, the leakage current generated by the first transistor T1 and the leakage current generated by the second transistor T2 are controlled to be stable. Thus, the voltage of the first node N1 is ensured to be stable.

In the light emission stage, the light emission control signal EM may provide a voltage only for the gate of the fifth transistor T5 to turn on the fifth transistor T5. At this time, the sixth transistor T6 has been controlled to be turned on by a sixth scan signal S6. In this manner, the first signal Vref1 provided by the first signal terminal is sent to the second node N2, and the voltage value of the first signal Vref1 may be adjusted according to the voltage Vref2 of the third node N3. Therefore, the voltage V1 of the first node, the voltage V2 of the second node and the voltage V3 of the third node satisfy the relationship of V1−Vref1=K(Vref2−Vref1), where K denotes a fixed value and 0<K<1. In this manner, the leakage current between the first node N1 and the second node N2 and the leakage current between the third node N3 and the first node N1 are relatively stable. Therefore, the voltage V1 of the first node N1 is stabilized.

Similarly, in the light emission stage, the light emission control signal EM may provide a voltage only for the gate of the sixth transistor T6 to turn on the sixth transistor T6. At this time, the fifth transistor T5 has been controlled to be turned on by a fifth scan signal S5. In this manner, the second signal Vref2 provided by the second signal terminal is sent to the third node N3, and the voltage value of the second signal Vref2 may be adjusted according to the voltage Vref1 of the second node N2. Therefore, the voltage V1 of the first node, the voltage V2 of the second node and the voltage V3 of the third node satisfy the relationship of V1−Vref1=K(Vref2−Vref1), where K denotes a fixed value and 0<K<1. In this manner, the leakage current between the first node N1 and the second node N2 and the leakage current between the third node N3 and the first node N1 are relatively stable. Therefore, the voltage V1 of the first node N1 is stabilized.

Alternatively, in the light emission stage, the light emission control signal EM may provide a voltage for the gate of the fifth transistor T5 and the gate of the sixth transistor T6 at the same time to control the fifth transistor T5, the sixth transistor T6 and the transistors of a light emission control module 14 to be turned on simultaneously. Thus, the stability of the voltage of the first node N1 can be ensured, and the brightness of the light-emitting element 20 is prevented from being affected.

In an embodiment, the potential of the first signal Vref1 and the potential of the second signal Vref2 vary synchronously in the first stage. In other words, in the first stage, the first signal Vref1 provided by the first signal terminal and the second signal Vref2 provided by the second signal terminal are variable voltage values.

Figure 7:
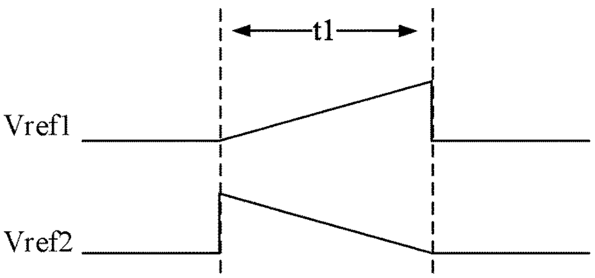
FIG. 7 is a timing diagram of another first signal and another second signal according to an embodiment of the present disclosure.

FIG. 7 is a timing diagram of another first signal and another second signal according to an embodiment of the present disclosure. As shown in FIG. 7, in the first stage t1, the potential of the first signal Vref1 and the potential of the second signal Vref2 may vary synchronously. According to different values of K, the two signals vary at different rates. For example, using K of ½ as an example, when the potential of the first signal Vref1 gradually increases (or decreases), the second signal Vref2 needs to gradually decrease (or increase) synchronously, and the variation slopes of these two signals are the same. Thus, the voltage V1 of the first node can be ensured to be stable and invariable, and the brightness of the light-emitting element 20 is ensured to be stable and invariable.

In another embodiment, the second node N2 may be further electrically connected to the first signal terminal. In the first stage, the first signal Vref1 provided by the first signal terminal satisfies that V1−Vref1=K(V3−Vref1), where K denotes a fixed value and 0<K<1. Alternatively, the third node N3 may be further electrically connected to the second signal terminal. In the first stage, the second signal Vref2 provided by the second signal terminal satisfies that V1−V2=K(Vref2−V2), where K denotes a fixed value and 0<K<1.

Figure 8:
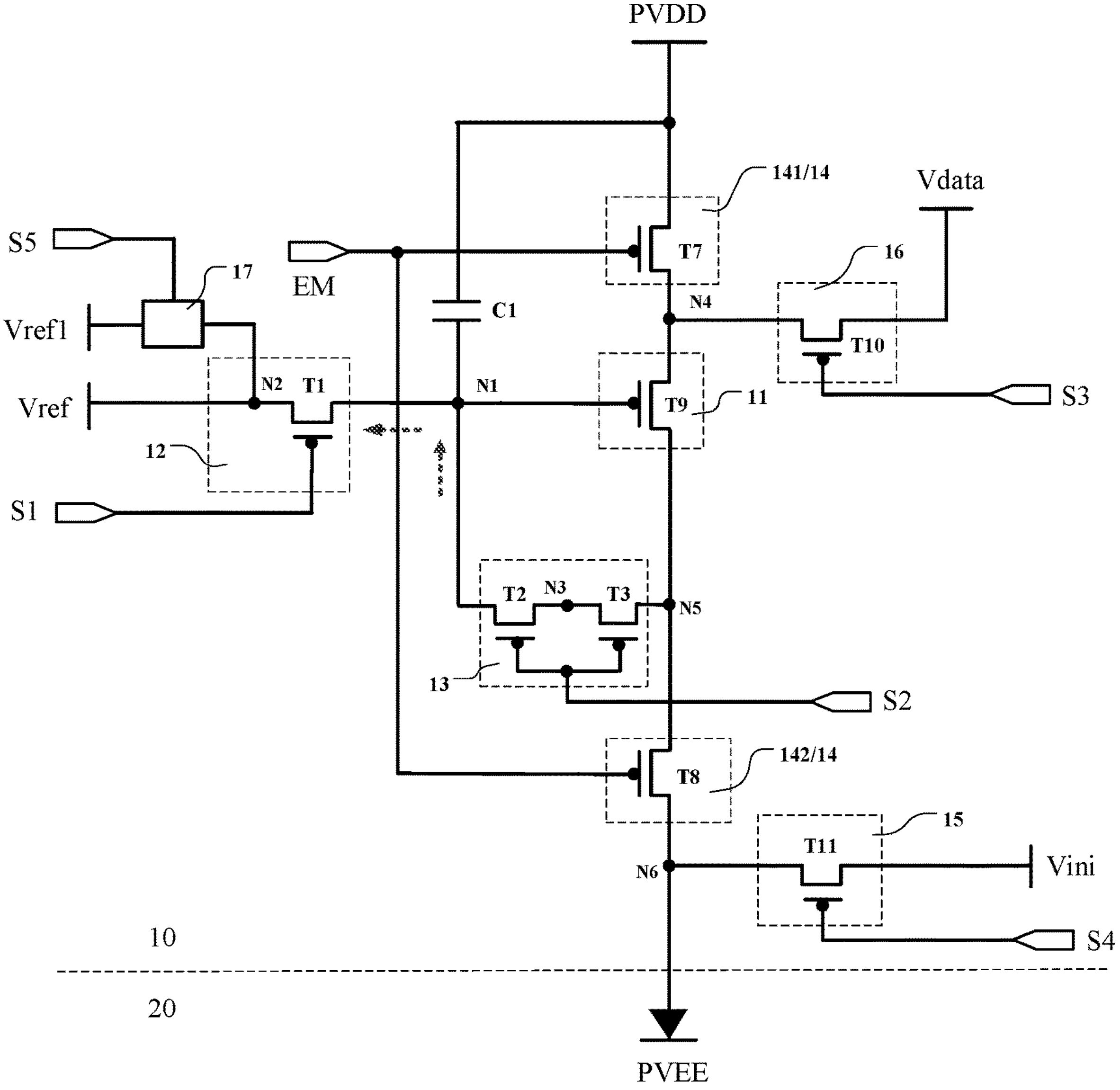
FIG. 8 is a view illustrating the structure of a pixel circuit and a light-emitting element of another display panel according to an embodiment of the present disclosure.
Figure 9:
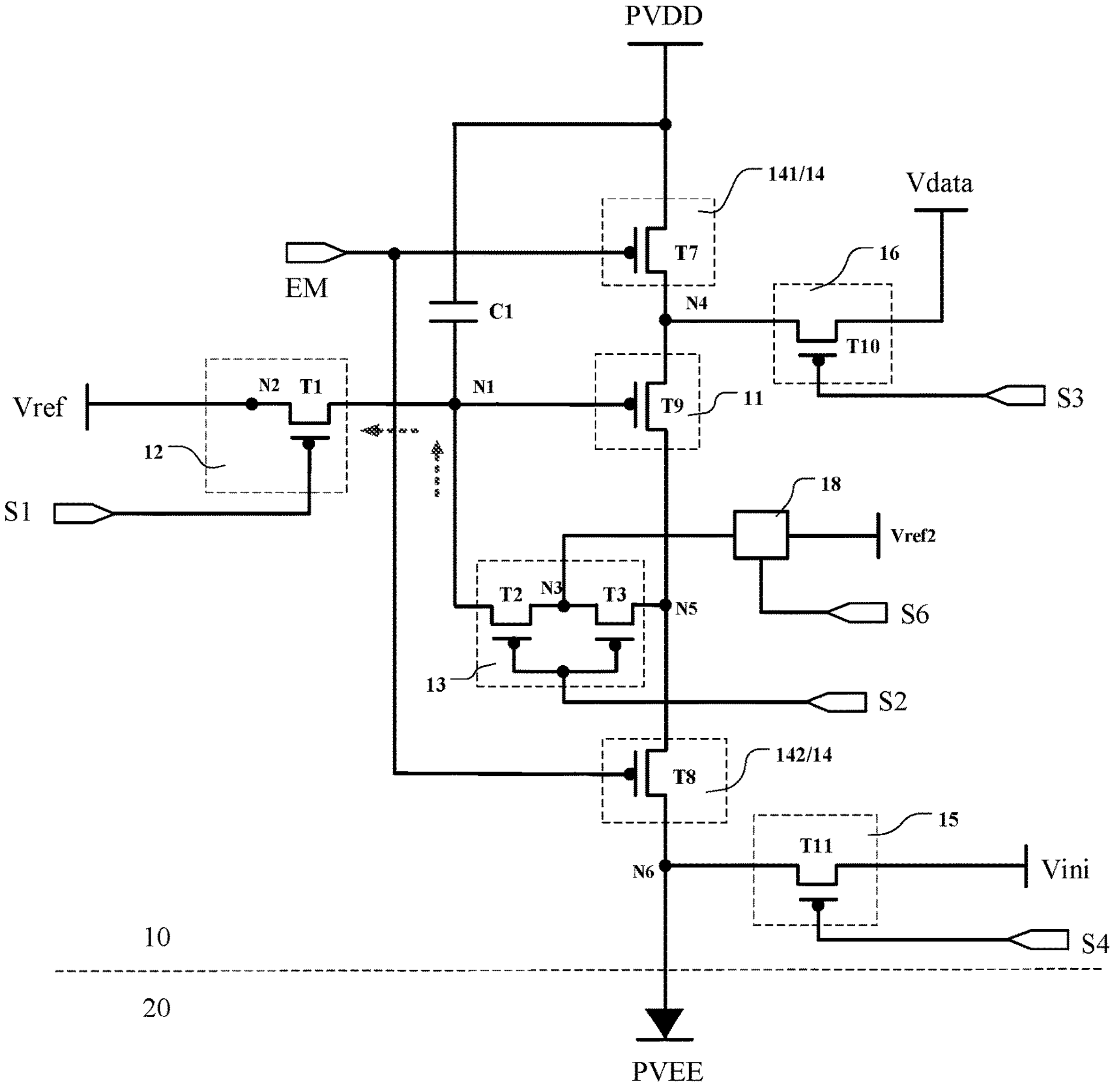
FIG. 9 is a view illustrating the structure of a pixel circuit and a light-emitting element of another display panel according to an embodiment of the present disclosure.

FIG. 8 is a view illustrating the structure of a pixel circuit and a light-emitting element of another display panel according to an embodiment of the present disclosure. FIG. 9 is a view illustrating the structure of a pixel circuit and a light-emitting element of another display panel according to an embodiment of the present disclosure. Referring to FIGS. 8 and 9, the first signal Vref1 provided by the first signal terminal is sent to the second node N2. The voltage value may be set according to the voltage V3 of the third node N3 to satisfy that V1−Vref1=K(V3−Vref1). The value of K is set for controlling the stability of the voltage V1 of the first node. Alternatively, the second signal Vref2 provided by the second signal terminal is sent to the third node N3. The voltage value may be set cording to the voltage V2 of the second node N2 to satisfy that V1−V2=K(Vref2−V2). The value of K is set for controlling the stability of the voltage V1 of the first node, thus, it is conducive to driving the light-emitting element 20 to emit light accurately.

In the first stage, the potential of the first signal Vref1 may vary synchronously with the potential of the third node. Alternatively, in the first stage, the potential of the second signal Vref2 may vary synchronously with the potential of the second node. In other words, the first signal Vref1 may vary in real time according to the variation of the voltage V3 of the third node. Alternatively, the second signal Vref2 may vary in real time according to the variation of the voltage V2 of the second node. In this manner, the voltage V1 of the first node may not be affected by the variation of the voltage V3 of the third node or the variation of the voltage V2 of the second node. Thus, the voltage V1 of the first node can be ensured to be stable and invariable, and the accuracy of the brightness of the light-emitting element 20 is ensured.

Further, in the first stage, the potential of the first signal Vref1 gradually decreases. Alternatively, in the first stage, the potential of the second signal Vref2 gradually decreases.

For example, the first transistor T1, the second transistor T2 and the third transistor T3 are p-type transistors. Referring to FIG. 8, in the light emission stage, the second transistor T2 and the third transistor T3 receive a second scan signal S2 (high-level signal) and are turned off. In this manner, the potential of the third node N3 is raised, that is, V3 increases gradually. To ensure that the ratio of the voltage difference between the voltage V3 of the third node and the voltage V1 of the first node N1 to the voltage difference between the voltage V1 of the first node N1 and the voltage V2 of the second node remains invariable, the voltage V2 of the second node N2 needs to be reduced, that is, the potential of the first signal Vref1 provided by the first signal terminal needs to gradually decrease. Thus, the voltage V1 of the first node can remain stable and invariable, and the display effect of the display panel is prevented from being affected by the brightness flicker of the light-emitting element 20.

Similarly, referring to FIG. 9, in the light emission stage, the first transistor T1 receives a first scan signal S1 (high-level signal) and is turned off. In this manner, the potential of the third node N3 is raised, that is, V3 increases gradually. The potential of the second signal Vref2 needs to gradually decrease to maintain the stability of the voltage V1 of the first node. Thus, the display effect of the display panel is prevented from being affected by the brightness flicker of the light-emitting element 20.

Further, in the first stage of one refresh frame, the first signal Vref1 satisfies that Vdata1'−Vth−Vref1=K(V3−Vref1), where K denotes a fixed value, 0<K<1, and Vdata1' denotes a data signal provided by the data signal terminal in the second stage of the current refresh frame. Alternatively, in the first stage of one refresh frame, the second signal Vref2 satisfies that Vdata2'−Vth−V2=K(Vref2−V2), where K denotes a fixed value, 0<K<1, and Vdata2' denotes a data signal provided by the data signal terminal in the second stage of the current refresh frame.

Due to the existence of the threshold voltage of the transistor, after the data signal Vdata1' is written into the first node N1, the voltage V1 of the first node satisfies that V1=Vdata1'−Vth; or after the data signal Vdata2' is written into the first node N1, the voltage V1 of the first node satisfies that V1=Vdata2'−Vth. In this manner, the first signal Vref1 in FIG. 8 needs to satisfy the relationship of Vdata1'−Vth−Vref1=K(V3−Vref1), where K denotes a fixed value and 0<K<1. Thus, the leakage current of the first transistor T1 and the leakage current of the second transistor T2 can be ensured to be relatively stable. Similarly, the second signal Vref2 in FIG. 9 needs to satisfy the relationship of Vdata2'−Vth−V2=K(Vref2−V2), where K denotes a fixed value and 0<K<1. In this manner, in each refresh frame, the voltage value of the first signal Vref1 or the voltage value of the second signal Vref2 is adjusted according to different data signals Vdata' currently written into the first node N1 to ensure that in each refresh frame, the voltage V1 of the first node can be effectively compensated. Therefore, the leakage currents generated by the transistors between nodes are stable, and the stability of the voltage V1 of the first node can be controlled, thus, it is conducive to stabilizing the brightness of the light-emitting element 20 to emit light accurately, and the display effect of the display panel can be improved.

In an embodiment, when the equivalent resistance of the first transistor T1 is the same as the equivalent resistance of the second transistor T2, the value of K is set to ½ to ensure that the voltage V1 of the first node N1 is stabilized at Vdata1'−Vth or Vdata2'−Vth, avoiding the influence of the voltage variation of the second node N2 and the voltage variation of the third node N3 on the voltage of the first node N1.

In addition, in an embodiment, in any two refresh frames, the first signal Vref1 remains consistent and satisfies that Vdata1"−Vth−Vref1=K(V3−Vref1) in the first stage, where K denotes a fixed value, 0<K<1, and Vdata1"−Vth denotes a virtual set value of the voltage V1 of the first node. Alternatively, in any two refresh frames, the second signal Vref2 remains consistent and satisfies that Vdata2"−Vth−V2=K(Vref2−V2) in the first stage, where K denotes a fixed value, 0<K<1, and Vdata2"−Vth denotes a virtual set value of the voltage V1 of the first node.

In any refresh frame of the display image of the display panel, the first signal Vref1 or the second signal Vref2 given in the first stage is consistent. Moreover, an appropriate first signal Vref1 is selected as the signal provided by the second node N2 or an appropriate second signal Vref2 is selected as the signal provided by the third node N3 in the first stage according to an actual condition. Therefore, in any refresh frame, the first signal Vref1 or the second signal Vref2 is set to be consistent with the first signal Vref1 or the second signal Vref2 in other refresh frames to make signals and the control circuit structure simple. At the same time, the first signal Vref1 or the second signal Vref2 can effectively compensate for the voltage V1 of the first node in each refresh frame to ensure that the leakage current of the first transistor T1 and the leakage current of the second transistor T2 can be effectively controlled and remain stable. In this manner, the stability of the voltage of the first node N1 can be ensured. Thus, the accuracy of the brightness can be improved, and the display effect of the display panel can be improved.

Further, in an embodiment, in any one refresh frame, the gray value of the light-emitting element 20 is within an interval [G1, G2]. When Vdata1" or Vdata2" serves as the data signal provided by the data signal terminal, the gray value of the light-emitting element is within an interval [(G1+G2)/2, G2]. In this manner, the effective control and the stability of the leakage currents of the transistors between the nodes can be implemented when the light-emitting element 20 is at the high grayscale value. Thus, the voltage of the first node N1 is stable. In addition, for refresh frames of other grayscales, especially refresh frames of high grayscales, the first signal Vref1 or the second signal Vref2 calculated through Vdata1" or Vdata2" can also control the leakage currents to a certain extent. Therefore, it can be ensured that the potential of the first node N1 is relatively stable, and it is conducive to driving the light-emitting element 20 to emit light accurately.

Further, with continued reference to FIG. 8, the pixel circuit 10 also includes a first signal input control module 17 connected between the second node N2 and the first signal terminal. The first signal input control module 17 is turned on before the first stage. Moreover, referring to FIG. 9, the pixel circuit further includes a second signal input control module 18 connected between the third node N3 and the second signal terminal. The second signal input control module 18 is turned on before the first stage. In this manner, the first signal input control module 17 is controlled to be turned on by a fifth scan signal S5 before the first stage, or the second signal input control module 18 is controlled to be turned on by a sixth scan signal S6 before the first stage. Thus, the writing of the first signal Vref1 or the writing of the second signal Vref2 is controlled to prevent the potential of the second node N2 or the potential of the third node N3 from being influenced at the moment when the signal input control module is turned on. Thus, the voltage V1 of the first node can be ensured to be stable, and the light-emitting element 20 can be driven to emit light stably.

Figure 10:
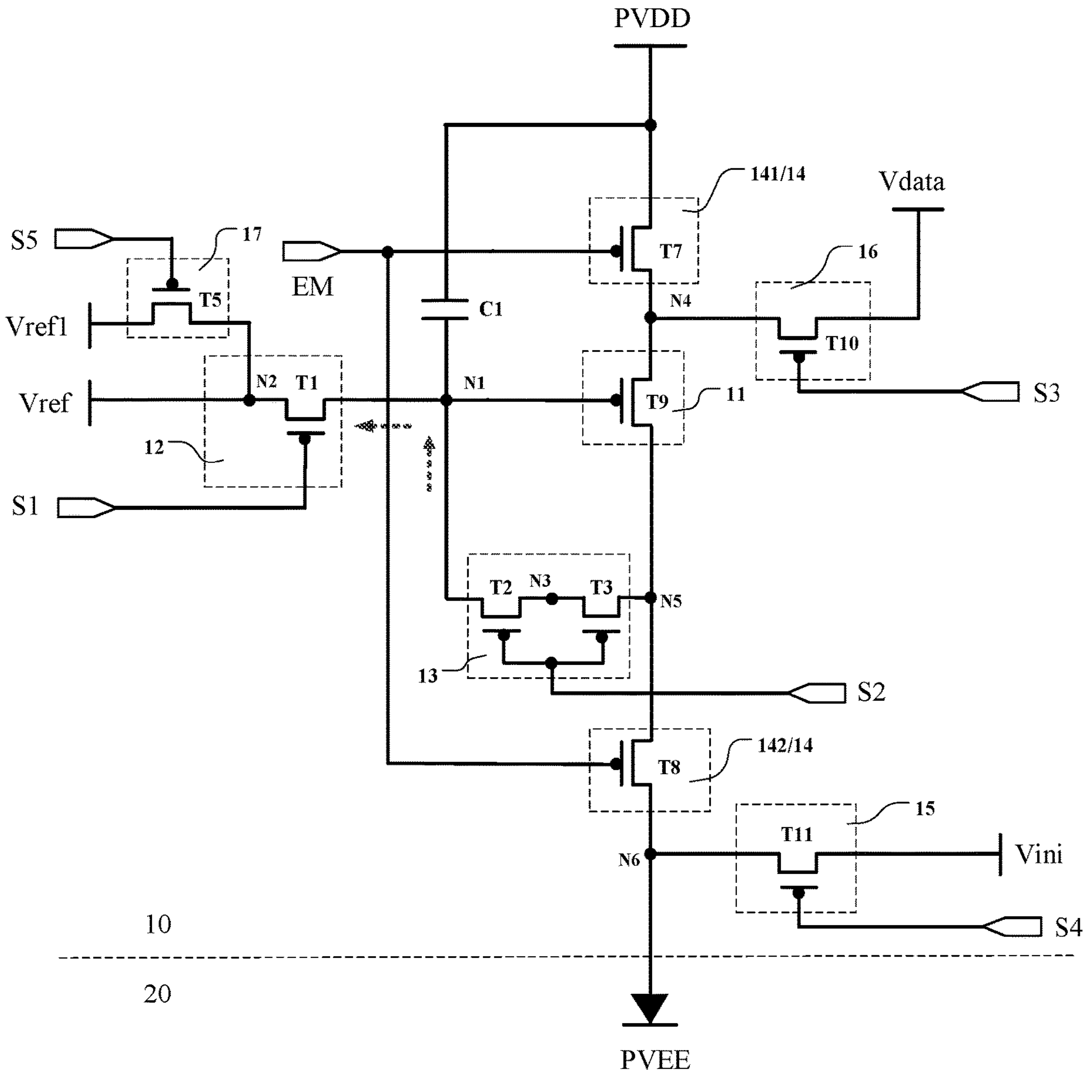
FIG. 10 is a view illustrating the structure of a pixel circuit and a light-emitting element of another display panel according to an embodiment of the present disclosure.
Figure 11:
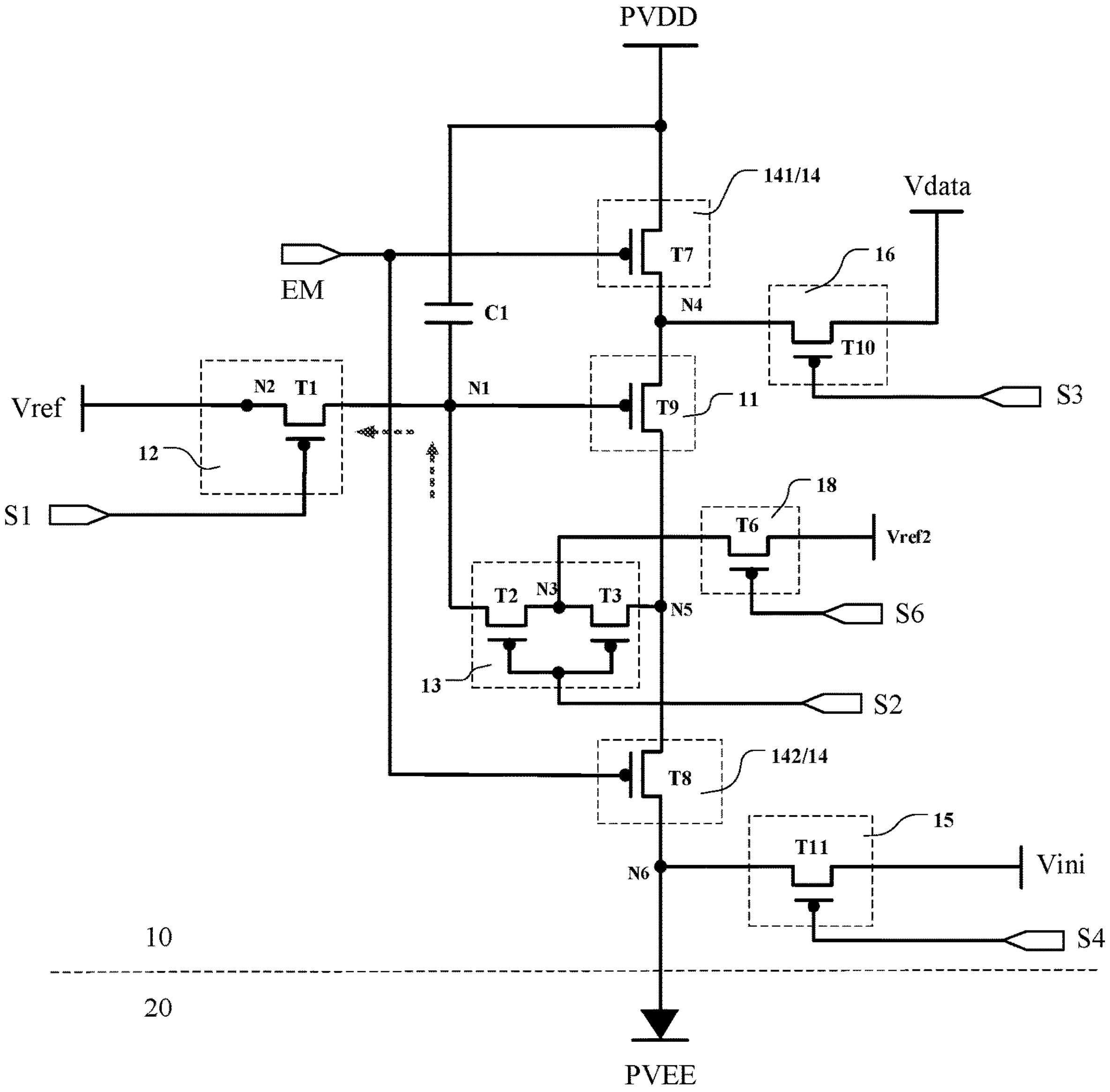
FIG. 11 is a view illustrating the structure of a pixel circuit and a light-emitting element of another display panel according to an embodiment of the present disclosure.

FIG. 10 is a view illustrating the structure of a pixel circuit and a light-emitting element of another display panel according to an embodiment of the present disclosure. FIG. 11 is a view illustrating the structure of a pixel circuit and a light-emitting element of another display panel according to an embodiment of the present disclosure. As shown in FIGS. 10 and 11, a first signal input control module 17 includes a fifth transistor T5. One end of the fifth transistor T5 is connected to the second node N2. Another end of the fifth transistor T5 is connected to the first signal terminal. The second signal input control module 18 includes a sixth transistor T6. One end of the sixth transistor T6 is connected to the third node N3. Another end of the sixth transistor T6 is connected to the second signal terminal. In this manner, a fifth scan signal S5 controls the fifth transistor T5 to be turned on or off by providing a voltage for the gate of the fifth transistor T5. A sixth scan signal S6 controls the sixth transistor T6 to be turned on or off by providing a voltage for the gate of the sixth transistor T6.

Further, in an embodiment, with continued reference to FIGS. 10 and 11, the pixel circuit 10 further includes a light emission control module 14. The light emission control module 14 includes a first light emission control unit 141 and a second light emission control unit 142. The first light emission control unit 141, the drive module 11, the second light emission control unit 142, and the light-emitting element 20 are sequentially connected in series between a first power terminal PVDD and a second power terminal PVEE. The first light emission control unit 141 includes a seventh transistor T7. The second light emission control unit 142 includes an eighth transistor T8. The gate of the seventh transistor T7 and the gate of the eighth transistor T8 are connected to a light emission control signal terminal. The gate of the fifth transistor T5 or the gate of the sixth transistor T6 is connected to the light emission control signal terminal.

At the moment when the pixel circuit 10 enters the light emission stage, a light emission control signal EM controls the seventh transistor T7 and the eighth transistor T8 to be turned on, and at the same time, the light emission control signal EM further controls the fifth transistor T5 or the sixth transistor T6 to be turned on, so that the first signal Vref1 provided by the first signal terminal and the second signal Vref2 provided by the second signal terminal are written into the second node N2 and the third node N3 respectively. In this manner, the leakage current generated by the first transistor T1 and the leakage current generated by the second transistor T2 are controlled to be stable. Thus, the voltage V1 of the first node N1 remains stable, and it is conducive to driving the light-emitting element 20 to emit light accurately.

On the basis of the various embodiments described above, as an alternative scheme, the equivalent resistance of the first transistor T1 is the same as the equivalent resistance of the second transistor T2, and K=½. The first transistor T1 and the second transistor T2 adopt the same transistors. Therefore, the two transistors have the same equivalent resistances. Since the leakage current generated by the transistor is only related to the voltage difference between the nodes at two ends of the transistor. Further, K is set to ½. Therefore, the voltage difference between V1 and V2 is half of the voltage difference between V3 and V2, that is, the voltage difference between V1 and V2 is the same as the voltage difference between V3 and V1. Thus, it is ensured that the leakage current of the first transistor T1 is the same as the leakage current of the second transistor T2, and that the flow direction of the leakage current of the first transistor T1 is the same as the flow direction of the leakage current of the second transistor T2, that is, the leakage current flows from the third node to the first node or from the first node to the third node. Thus, the voltage of the first node N1 is ensured to be stable and invariable.

Figure 12:
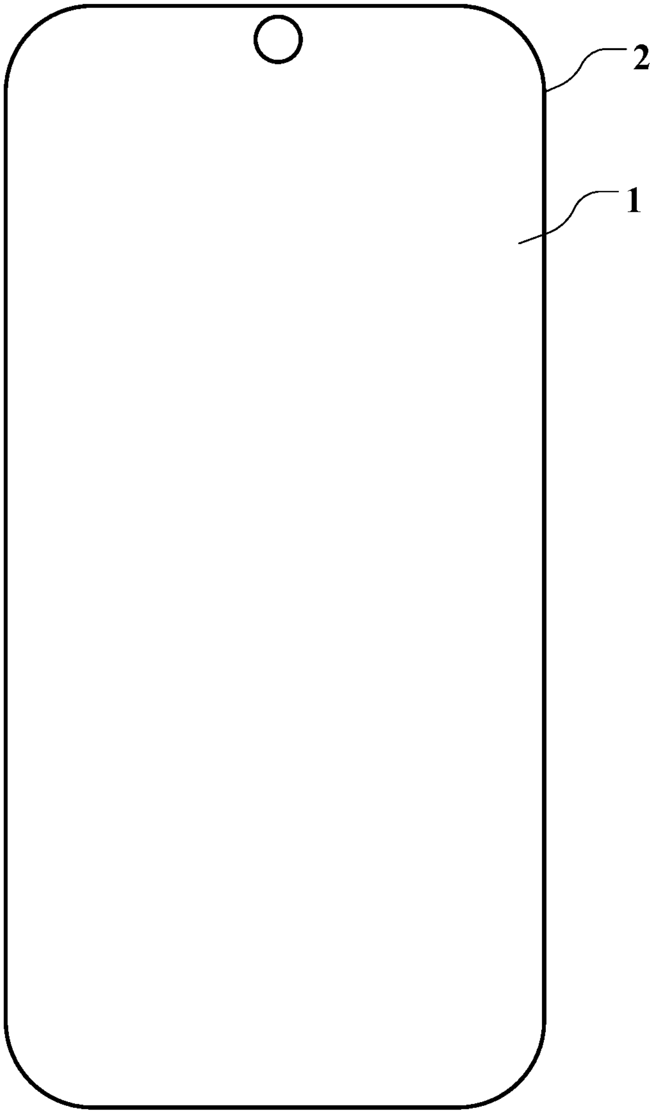
FIG. 12 is a view illustrating the structure of a display device according to an embodiment of the present disclosure.

The embodiments of the present application further provide a display device. FIG. 12 is a view illustrating the structure of a display device according to an embodiment of the present disclosure. Referring to FIG. 12, the display device 2 may include any display panel 1 provided by the previous embodiments. Moreover, since the display device is made of the display panel described above, the display device has the same technical effects or corresponding technical effects of the display panel described above. It is to be noted that the display device further includes other components for supporting the normal operation of the display device. The display device may be a mobile phone, a tablet computer, a computer, a television, or a wearable smart device. This is not limited in this embodiment.

It is to be noted that the preceding are only preferred embodiments of the present disclosure and technical principles used therein. It is to be understood by those skilled in the art that the present disclosure is not limited to the embodiments described herein. Those skilled in the art can make various apparent modifications, adaptations, combinations and substitutions without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A display panel, comprising: a pixel circuit and a light-emitting diode; wherein the pixel circuit comprises a drive circuit, a reset circuit and a compensation circuit, wherein the drive circuit is configured to provide a drive current for the light-emitting diode, the drive circuit comprises a drive transistor, and a gate of the drive transistor is connected to a first node;

the reset circuit is configured to provide a reset signal for the gate of the drive transistor, and the reset circuit comprises a first transistor, wherein one end of the first transistor is connected to the first node, and another end of the first transistor is connected to a second node;

the compensation circuit is configured to compensate for a threshold voltage of the drive transistor, and the compensation circuit comprises a second transistor and a third transistor, wherein a connection node between the second transistor and the third transistor is a third node, and another end of the second transistor is connected to the first node; and the display panel comprises a plurality of refresh frames, wherein in at least one refresh frame of the plurality of refresh frames, in a first stage comprised in a working process of the pixel circuit, the first transistor and the second transistor are turned off, and a voltage V1 of the first node, a voltage V2 of the second node and a voltage V3 of the third node satisfy that $V1-V2=K(V3-V2)$, wherein K denotes a fixed value, and $0<K<1$, such that a voltage difference between V1 and V2 is less than a voltage difference between V3 and V2, and a ratio of the voltage difference between V1 and V2 to the voltage difference between V3 and V2 is fixed;

wherein the third node is further connected to a second signal terminal, a second signal Vref2 provided by the second terminal satisfies that $V1-V2=K(Vref2-V2)$.

2. The display panel according to claim 1, wherein the pixel circuit further comprises a data write circuit, the data write circuit comprises a tenth transistor, and the data write circuit is configured to write a data signal into the gate of the drive transistor; and in at least one refresh frame of the plurality of refresh frames, the working process of the pixel circuit further comprises a second stage, wherein in the second stage, the second transistor and the third transistor are turned on, and the data write circuit is configured to write, into the first node, the data signal that is provided by a data signal terminal and is compensated for by the threshold voltage Vth of the drive transistor.

3. The display panel according to claim 2, wherein the second node is further connected to a first signal terminal, and in the first stage, a first signal Vref1 provided by the first signal terminal and the second signal Vref2 satisfy that $V1-Vref1=K(Vref2-Vref1)$.

4. The display panel according to claim 3, wherein in the first stage of the at least one refresh frame, the first signal Vref1 and the second signal Vref2 satisfy that $Vdata'-Vth-Vref1=K(Vref2-Vref1)$, wherein Vdata' denotes a data signal provided by the data signal terminal in the second stage of the at least refresh frame.

5. The display panel according to claim 3, wherein in any two refresh frames of the plurality of refresh frames, the first signal Vref1 and the second signal Vref2 remain invariable and satisfy that $Vdata''-Vth-Vref1=K(Vref2-Vref1)$ in the first stage, wherein $Vdata''-Vth$ denotes a virtual set value of the voltage V1 of the first node.

6. The display panel according to claim 3, wherein a potential of the first signal Vref1 and a potential of the second signal Vref2 are fixed in the first stage.

7. The display panel according to claim 3, wherein the reset circuit is connected between a reset signal terminal and the gate of the drive transistor;

the reset circuit further comprises a fourth transistor, and a connection node between the fourth transistor and the first transistor is the second node; and the pixel circuit further comprises a first signal input control circuit and a second signal input control circuit, wherein the first signal input control circuit is connected between the second node and the first signal terminal, the second signal input control circuit is connected between the third node and the second signal terminal, and the first signal input control circuit and the second signal input control circuit are turned on before the first stage.

8. The display panel according to claim 7, wherein the first signal input control circuit comprises a fifth transistor, wherein one end of the fifth transistor is connected to the second node, and another end of the fifth transistor is connected to the first signal terminal; and the second signal input control circuit comprises a sixth transistor, wherein one end of the sixth transistor is connected to the third node, and another end of the sixth transistor is connected to the second signal terminal.

9. The display panel according to claim 3, wherein the reset circuit is connected between a reset signal terminal and the gate of the drive transistor, and the reset signal terminal also serves as the first signal terminal; and the pixel circuit further comprises a second signal input control circuit, wherein the second signal input control circuit is connected between the third node and the second signal terminal, and the second signal input control circuit is turned on before the first stage.

10. The display panel according to claim 9, wherein the second signal input control circuit comprises a sixth transistor, wherein one end of the sixth transistor is connected to the third node, and another end of the sixth transistor is connected to the second signal terminal;

the pixel circuit further comprises a light emission control circuit, and the light emission control circuit comprises a first light emission control unit and a second light emission control unit, wherein the first light emission control unit, the drive circuit, the second light emission control unit, and the light-emitting diode are sequentially connected in series between a first power terminal and a second power terminal;

the first light emission control unit comprises a seventh transistor, the second light emission control unit comprises an eighth transistor, and a gate of the seventh transistor and a gate of the eighth transistor are connected to a light emission control signal terminal; and a gate of the sixth transistor is connected to the light emission control signal terminal.

11. The display panel according to claim 2, wherein in the first stage of the at least one refresh frame, the second signal Vref2 satisfies that $Vdata2'-Vth-V2=K(Vref2-V2)$, wherein Vdata2' denotes a data signal provided by the data signal terminal in the second stage of the at least one refresh frame.

12. The display panel according to claim 2, wherein in any two refresh frames of the plurality of refresh frames, the second signal Vref2 remains consistent and satisfies that $Vdata2''-Vth-V2=K(Vref2-V2)$ in the first stage, wherein Vdata2"−Vth denotes a virtual set value of the voltage V1 of the first node.

13. The display panel according to claim 1, wherein in the first stage, a potential of the second signal Vref2 is configured to vary synchronously with a potential of the second node.

14. The display panel according to claim 13, wherein in the first stage, the potential of the second signal Vref2 gradually decreases.

15. The display panel according to claim 1, wherein the pixel circuit further comprises a second signal input control circuit, wherein the second signal input control circuit is connected between the third node and the second signal terminal, and the second signal input control circuit is turned on before the first stage.

16. The display panel according to claim 15, wherein the second signal input control circuit comprises a sixth transistor, wherein one end of the sixth transistor is connected to the third node, and another end of the sixth transistor is connected to the second signal terminal.

17. The display panel according to claim 16, wherein the pixel circuit further comprises a light emission control circuit, and the light emission control circuit comprises a first light emission control unit and a second light emission control unit, wherein the first light emission control unit, the drive circuit the second light emission control unit, and the light-emitting diode are sequentially connected in series between a first power terminal and a second power terminal;

the first light emission control unit comprises a seventh transistor, the second light emission control unit comprises an eighth transistor, and a gate of the seventh transistor and a gate of the eighth transistor are connected to a light emission control signal terminal; and a gate of the sixth transistor is connected to the light emission control signal terminal.

18. A display device, comprising a display panel, wherein the display panel comprises a pixel circuit and a light-emitting diode, and the pixel circuit comprises a drive circuit, a reset circuit and a compensation circuit; wherein the drive circuit is configured to provide a drive current for the light-emitting diode, the drive circuit comprises a drive transistor, and a gate of the drive transistor is connected to a first node;

the reset circuit is configured to provide a reset signal for the gate of the drive transistor, and the reset circuit comprises a first transistor, wherein one end of the first transistor is connected to the first node, and another end of the first transistor is connected to a second node;

the compensation circuit is configured to compensate for a threshold voltage of the drive transistor, and the compensation circuit comprises a second transistor and a third transistor, wherein a connection node between the second transistor and the third transistor is a third node, and another end of the second transistor is connected to the first node; and the display panel comprises a plurality of refresh frames, wherein in at least one refresh frame of the plurality of refresh frames, in a first stage comprised in a working process of the pixel circuit, the first transistor and the second transistor are turned off, and a voltage V1 of the first node, a voltage V2 of the second node and a voltage V3 of the third node satisfy that $V1-V2=K(V3-V2)$, wherein K denotes a fixed value, and $0<K<1$, such that a voltage difference between V1 and V2 is less than a voltage difference between V3 and V2, and a ratio of the voltage difference between V1 and V2 to the voltage difference between V3 and V2 is fixed;

wherein the third node is further connected to a second signal terminal, a second signal Vref2 provided by the second terminal satisfies that $V1-V2=K\ (Vref2-V2)$.

19. The display device according to claim 18, wherein the pixel circuit further comprises a data write circuit, the data write circuit comprises a tenth transistor, and the data write circuit is configured to write a data signal into the gate of the drive transistor; and in at least one refresh frame of the plurality of refresh frames, the working process of the pixel circuit further comprises a second stage, wherein in the second stage, the second transistor and the third transistor are turned on, and the data write circuit is configured to write, into the first node, the data signal that is provided by a data signal terminal and is compensated for by the threshold voltage Vth of the drive transistor.

20. The display device according to claim 19, wherein the second node is further connected to a first signal terminal, and in the first stage, a first signal Vref1 provided by the first signal terminal and the second signal Vref2 satisfy that $V1-Vref1=K(Vref2-Vref1)$.

* * * * *